Patented Apr. 15, 1952

2,593,279

UNITED STATES PATENT OFFICE 2,593,279

RECLAIMING RUBBER

Joseph C. Elgin, Princeton, N. J., assignor to U. S. Rubber Reclaiming Company, Inc., Buffalo, N. Y., a corporation of New York No Drawing. Application July 11, 1947, Serial No. 760,501

10 Claims. (Cl. 260—720)

This invention relates to the manufacture of reclaimed rubber and particularly to the devulcanization of rubber.

This application is a continuation-in-part of my copending application Serial No. 618,573, filed September 25, 1945.

The reclaiming of rubber from scrap material, such as old tires, shoes, mechanical goods, etc., i. e. the conversion of vulcanized rubber into a plastic mass which can be remolded and revulcanized into new articles, is an old and well established industry. The purpose of the reclaiming procedures is to soften or to plasticize the rubber sufficiently that, after adding various compounding and revulcanizing ingredients, it may be remolded while leaving it in a chemical condition such that it can be revulcanized, e. g. in accordance with established manufacturing procedures.

Various reclaiming agents have been used in such processes. Among the agents which have given effective results are various aliphatic and aromatic organic sulfur compounds, among them mercaptans, sulfides and, as disclosed and claimed in my copending application, disulfides. Among such materials used by me and by others before the present invention are primary aliphatic mercaptans, phenyl mercaptan (thiophenol), and primary aliphatic sulfides.

Disulfides of this character, as set forth in my said application are specifically and broadly claimed therein.

The primary compounds (i. e., those having but one other carbon atom attached to the carbon atom which carries the sulfur) have been considered best for this purpose, although certain secondary compounds have also been employed. No tertiary mercaptans or disulfides had ever been employed before this invention and there was no reason to expect that they would have any outstanding utility for devulcanization, or even equal the primary compounds.

I have now found that peculiarly effective results can be obtained in the devulcanization of rubber and the like by the use of compounds wherein the sulfur bearing carbon (i. e., the carbon atom which is directly linked to a sulfur atom) is directly attached to three carbon atoms in addition to the sulfur atom. The present invention in its broader aspects contemplates the use of such materials generally, and in certain of its more specific aspects contemplates the use of such materials wherein no sulfur atom has more than one carbon atom attached thereto. Surprisingly effective results have been obtained, for example, by the use of tertiary mercaptans and tertiary disulfides in the reclaiming of rubber. These not only give more desirable reclaiming and better quality revulcanized materials, but are more active than the primary compounds and most other available reclaiming agents. In some instances the tertiary compound is more than twice as effective as the corresponding primary compound.

The high molecular weight mercaptans such as tertiary dodecyl mercaptan and tertiary tetradecyl mercaptan and even higher have been effectively employed and the lower mercaptans such as butyl mercaptan and those of intermediate weight.

Similarly, with the disulfides one may use low molecular weight, especially di-tertiary-butyl disulfide, di-tertiary hexyl disulfide, di-tertiary-octyl disulfide, and higher molecular weight, such as di-tertiary-hexadecyl disulfide, and also tertiary disulfides of intermediate weight.

The present invention increases the effectiveness and efficiency of the usual reclaiming processes and is also useful in certain improved devulcanization procedures as, for example, those claimed in Patent No. 2,415,449 of Edward F. Sverdrup and the present applicant.

In carrying out a procedure embodying the invention, the rubber, if not already in a thin or finely divided form, is desirably sufficiently comminuted either before or during the treatment so that the heat and reclaiming agents may penetrate it rapidly. It is advantageously ground in the usual manner into small particles.

The temperature of treatment should be above the boiling point of water, advantageously above about 300° F., and below the temperature of thermal decomposition of the rubber. The most advantageous range is between 300 and 450° F. The concentration of reclaiming agent in such case may be about 0.1%–7% of the weight of scrap rubber with distinct advantage in the range 0.2–4%; and in special but infrequent cases may be profitably as high as 15%. The advantage to be gained from a given increase of concentration of the reclaiming agent diminishes as the concentration increases and at high concentrations may actually prove a disadvantage.

Heating may be by any suitable means, e. g. radiant energy, especially infra red radiation; alternating stresses, mechanical or electrical, especially high frequency alternating voltage, milling or mastication; or treatment on hot rolls or in heated mixing or extrusion apparatus; etc.

The time may vary from a minute or less to 12 hours or more depending upon the particular material treated and the particular conditions of treatment.

Excellent results are obtained, in many instances, by heating in a digester at a temperature in the 300–420° F. range for a period of several hours, for example, until there is obtained a Williams plasticity number of 6 or below (Williams plastometer scale at 70° C.).

If undue vaporization of the reclaiming agent is to be avoided, it is advantageous to treat the mass of rubber in a confined space in which an appreciable vapor pressure of said agent is maintained. For this reason an autoclave or extrusion plasticator, or an enclosed masticating or mixing mill, e. g. of the Banbury or Werner-Pfleider types, will be preferable to treatment in open air. A further advantage of the confined treatment with volatile reclaiming agents is that by reduction of pressure and "sweeping" with other gas or vapor the reclaiming agent may be largely removed which aids in the termination of the treatment at the desired point. In general, excellent results have been obtained by the use of screw plasticators of the type disclosed in the copending application Serial No. 695,630, filed September 9, 1946.

Desirably, in certain instances, the mixture of rubber and reclaiming agent, with or without a softening agent, and/or other ingredients may be treated in accordance with this invention in the form of a thin film or other extended surface condition. Most advantageously, it is in finely divided crumbs making a porous mass into which the heating medium, e. g. saturated steam, can readily penetrate.

The invention in its broader aspects is not only adapted for reclaiming vulcanized natural rubber but is also well adapted to the reclaiming of synthetic rubber, such, for example, as neoprene (a long-chain synthetic rubber made by the polymerization of mono-chloro-butadiene), Buna S (GR-S, a copolymer of butadiene and styrene), Buna N (a copolymer of butadiene and acrylonitrile), etc. The term "rubber" as used herein, except where otherwise qualified, is accordingly to be understood to include both natural and artificial rubber, especially the conjugated diolefine polymers. In the specific examples, however, the names "inner tube scrap," and "tire tread scrap" refer to natural rubber scrap except where otherwise qualified.

Although I am giving below certain specific examples of my invention and its application in practical use and am giving also certain modifications and alternatives, it should be understood that these are not intended to be exhaustive or to be limiting of the invention. On the contrary, I am giving these as illustrations and am giving explanations herein in order to acquaint others skilled in the art with my invention and the principles thereof and a suitable manner of its application in practical use, so that others skilled in the art may be enabled to modify the invention and to adapt it and apply it in numerous forms, each as may be best suited to the requirements of a particular use.

In the following examples the quantities of all ingredients are by weight unless otherwise specified. Natural rubber is treated except as specified.

Example I 380 parts of red inner tube scrap ground to 30 mesh size were mixed with 4 parts of tertiary dodecyl mercaptan. The resulting mixture was heated in pans in thin layers for 40 minutes at 338° F. in open steam in an autoclave. The result was a notably satisfactory reclaim of plasticity number 3.91. (Williams parallel plate 3' at 70° C.).

Example II 380 parts of red inner tube scrap ground to 30 mesh size were mixed with 20 parts of tertiary octyl mercaptan. The resulting mixture was heated in pans in thin layers for 40 minutes at 338° F. in open steam in an autoclave. The result was a very soft reclaim of plasticity number 1.83 (Williams parallel plate 3' at 70° C.).

Example III 380 parts of red inner tube scrap ground to 30 mesh size were mixed with 10 parts of tertiary butyl mercaptan. The resulting mixture was heated in pans in thin layers for 40 minutes at 338° F. in open steam in an autoclave. The result was a reclaim of good quality. Plasticity number 3.41 (Williams parallel plate).

Example IV 380 parts of red inner tube scrap ground to 30 mesh size were mixed with 10 parts of tertiary octyl mercaptan. The resulting mixture was heated in pans in open steam for six hours at 338° F. The resulting product was a reclaim of good quality. Plasticity number 5.36.

Example V 380 parts of red inner tube scrap ground to 30 mesh size were mixed with 10 parts of tertiary tetradecyl mercaptan. The resulting mixture was heated in pans in open steam for six hours at 338° F. The product was a reclaim of good quality. Plasticity number 5.47.

Example VI 100 parts of 2 mesh rubber tire tread scrap were mixed with 1.5 parts of tertiary dodecyl mercaptan, 3 parts of process oil, 208 parts of water, and 5 parts of caustic soda (76% soda ash). This was heated in a closed digester for 5½ hours at 225° F. and 5 hours additional at 388° F. The resulting product after being washed and dried gave a reclaim with properties equivalent to those of a commercial alkali process reclaim. The plasticity number was 4.9.

Example VII 95 parts of red inner tube scrap were mixed with 0.50 parts of tertiary tetradecyl mercaptan, 1.50 parts of Solvesso #3 (a high aromatic petroleum naphtha of boiling range 340°–410° F., having a specific gravity of 0.883, an aniline point of 22.7, containing 95% aromatics, having a flash point of 130° F., and initial boiling point of 347° F., a 50% boiling point of 373° F. and a final boiling point of 412° F.), 1.5 parts of engine oil, 0.25 part of oleic acid, and 1.5 parts of water. This was processed through a screw plasticator (as set forth in said application Serial No. 695,630) at 47 pounds per hour, with a devulcanizing time of approximately 2.7 minutes at about 365° F. The product was a reclaim of good quality. Plasticity number 2.73.

Example VIII 47.5 parts of 24 mesh tire peels and 47.5 parts 24 mesh Buna S tire peels were mixed with 1 part tertiary lauryl mercaptan, 1.50 parts of Solvesso

3, 0.5 part of water. This was processed through the plasticator at 14.4 pounds per hour, with a devulcanizing time of approximately 9 minutes at about 400° F. The product was a reclaim of good quality. Plasticity number 6.10.

Example IX 380 parts of Buna S tire peels ground to 24 mesh size were mixed with 3 parts of tertiary lauryl mercaptan, 40 parts of petroleum resin (P. R. R. #1), 4 parts of lignin, and 2 parts of triethanol amine, and heated for 20 minutes at 338° F. in pans, in open steam. The resulting product was a reclaim of good quality.

Example X 95 parts of natural rubber peels reduced to 24 mesh crumbs is mixed with 0.5 part of tertiary lauryl mercaptan, 1.5 parts of Houdry naphtha, 1.5 parts of lecithin, and 1.5 parts of water, and passed through the screw plasticator with a reaction period of about 2.8 minutes at a temperature of about 370° F. There is obtained an excellent reclaim having a Williams plasticity number of 4.25.

Example XI 95 parts of 30 mesh red inner tube stock is mixed with 5.84 parts of tertiary dodecyl mercaptan and subjected for 1 hour to a temperature of 338° F. in an open steam pan in an autoclave. There is obtained a very satisfactory soft reclaim having a Williams plasticity number of 3.27.

Example XII 95 parts of 30 mesh red inner tube stock were mixed with 4.73 parts of tertiary decyl mercaptan and devulcanized in pans in open steam at 338° F. for 1 hour in an autoclave. A very soft and tacky reclaim was obtained.

Example XIII 95 parts of red inner tube scrap in crumb form of 12 mesh size are mixed with a solution consisting of 3.5 parts of Solvesso #3, 1 part of engine oil, and 2 parts of di-tertiary-butyl disulfide, the resulting mixture is passed through a tubing machine provided with a nozzle for an annular opening a few millimeters in radius and several inches in length steam-jacketed to bring the composition in the nozzle quickly to a temperature of about 400° F. and to hold it at approximately that temperature until discharged into a cooling atmosphere by which the treatment is quickly terminated. The approximate time within the treating zone is between three and four minutes. The product is a reclaim of excellent quality.

Example XIV 95 parts of natural rubber peels reduced to 24 mesh crumbs is mixed with 0.5 part of di-tertiary hexyl disulfide, 1.5 parts of Houdry naphtha, 1.5 parts of engine oil, 0.5 part of lecithin, and 1.5 parts of water and passed through the screw plasticator with a reaction period of about 2.8 minutes at a temperature of about 378° F. having a Williams plasticity number of 3.88.

Example XV 47.5 parts of 12 mesh Buna S peels are blended with 47.5 parts by weight of 12 mesh natural rubber peels and thoroughly mixed with 1 part di-tertiary-butyl disulfide, 1.5 parts Solvesso #3, 0.5 part lecithin, and 1.5 parts of water. This stock is then passed through a 3" diameter screw plasticator equipped with a 2 11/32" pin in a 3" die, rotating at 70 R. P. M. at a temperature of 355-382° F. and a rate of 26.8 lbs. per hour. The resulting product is an excellent reclaim of 5.16 Williams plasticity and a tensile strength of 1108 lbs. when compounded by the Reclaim Association formula at 40 lbs. steam for 30 minutes.

Example XVI 95.0 parts of Buna S peels are mixed with 1.5 parts di-tertiary-butyl disulfide, 1.50 parts Solvesso #3, 0.25 parts oleic acid, 5.00 parts Naftolen R-100, 1.50 parts di-secondary-butyl catechol, and 1.50 parts of water. This mixture is then processed through a 3" diameter plasticator rotating at 104 R. P. M. equipped with a 1 11/32" pin in a 2" diameter die at 340-362° F. at a rate of 26 lbs per hour. The product is a good reclaim of 5.45 Williams plasticity.

Example XVII 95.0 parts of 30 mesh red inner tube scrap were heated with 5.00 parts of di-tertiary-butyl disulfide for one hour in pans in open steam at 338° F. The product was a satisfactory reclaim of Williams plasticity number 4.57.

Certain subject matter disclosed but not claimed herein is claimed in the following applications, filed by me and Edward F. Sverdrup; Serial No. 695,630, filed September 9, 1946; Serial No. 193,688, filed November 2, 1950; and Serial No. 203,257, filed December 29, 1950.

I claim:

1. A method of reclaiming vulcanized rubber which comprises heating such material to a temperature not substantially less than 300° F. and below the temperature of thermal decomposition of the rubber in the presence of not over 15% of an organic sulfur-containing compound of the class consisting of aliphatic mercaptans, and aliphatic disulfides in which a carbon to which sulfur is directly attached has three carbon atoms attached thereto.

2. A method of reclaiming material of the class consisting of natural rubber, polychloroprene, and copolymers of butadiene with styrene or acrylonitrile which comprises heating such material to a temperature not substantially less than 300° F. and below the temperature of thermal decomposition of the material in the presence of not over 15% of an aliphatic tertiary mercaptan.

3. A method such as set forth in claim 2 wherein the mercaptan is tertiary dodecyl mercaptan.

4. A method of reclaiming vulcanized natural rubber which comprises heating the rubber to a temperature of from about 300° F. to about 450° F. in the presence of a proportion in the range 0.1 through 7% of the vulcanized rubber by weight of an aliphatic tertiary dodecyl mercaptan.

5. A method of reclaiming material of the class consisting of natural rubber, polychloroprene, and copolymers of butadiene with styrene or acrylonitrile which comprises heating such material to a temperature not substantially less than 300° F. and below the temperature of thermal decomposition of the material in the presence of a composition in the range 0.1 through 7% by weight of the vulcanized material of an aliphatic tertiary disulfide.

6. A method of reclaiming material of the class consisting of natural rubber, polychloroprene, and copolymers of butadiene with styrene or acrylonitrile which comprises heating such material to a temperature not substantially less than 300° F. and below the temperature of thermal decomposition of the material in the presence of not over 15% of an aliphatic di-tertiary disulfide.

7. A method of reclaiming vulcanized rubber which comprises heating such vulcanized rubber to a temperature not substantially less than 300° F. and below the temperature of thermal decomposition of the rubber in the presence of a proportion in the range 0.1 through 7% by weight of the vulcanized rubber of an aliphatic di-tertiary butyl disulfide.

8. A method of devulcanizing natural rubber which comprises heating such rubber to a temperature in the range 300–420° F. in the presence of not over 15% of an organic compound of the class consisting of aliphatic disulfides and aliphatic mercaptans in which the carbon of the S—C group has three other carbon atoms directly attached thereto.

9. A method of reclaiming material of the class consisting of natural rubber, polychloroprene, and copolymers of butadiene with styrene or acrylonitrile which comprises heating such material to a temperature not substantially less than 300° F. and below the temperature of thermal decomposition of the material in the presence of a proportion in the range 0.1 through 7 per cent of said vulcanized material by weight of an organic compound of the class consisting of aliphatic disulfides, and aliphatic mercaptans in which the carbon of the S—C group has three other carbon atoms directly attached thereto.

10. A method of reclaiming material of the class consisting of natural rubber, polychloroprene, and copolymers of butadiene with styrene or acrylonitrile which comprises heating such material to a temperature in the range 300–420° F. in the presence of a proportion in the range 0.1 through 7 per cent of the vulcanized material by weight of an organic sulfur-containing compound of the class consisting of aliphatic mercaptans and aliphatic disulfides in which a carbon to which sulfur is directly attached has three carbon atoms attached thereto.

JOSEPH C. ELGIN.

REFERENCES CITED

The following references are of record in the file of this patent:

UNITED STATES PATENTS

| Number | Name | Date |
|---|---|---|
| 2,191,266 | Williams | Feb. 20, 1940 |
| 2,193,624 | Garvey | Mar. 20, 1940 |
| 2,333,810 | Neal et al. | Nov. 9, 1943 |
| 2,359,122 | Kirby et al. | Sept. 26, 1944 |
| 2,408,296 | Cotton | Sept. 26, 1946 |
| 2,414,145 | Evans | Jan. 14, 1947 |
| 2,415,449 | Sverdrup et al. | Feb. 11, 1947 |
| 2,425,840 | Schulze et al. | Aug. 19, 1947 |
| 2,510,808 | Frolich | June 6, 1950 |